United States Patent
Yamamoto et al.

(10) Patent No.: US 10,371,931 B2
(45) Date of Patent: Aug. 6, 2019

(54) DIGITAL MICROSCOPE APPARATUS, METHOD OF SEARCHING FOR IN-FOCUS POSITION THEREOF, AND PROGRAM

(71) Applicant: Sony Corporation, Tokyo (JP)

(72) Inventors: Takashi Yamamoto, Tokyo (JP); Takuya Oshima, Chiba (JP); Ryu Narusawa, Kanagawa (JP); Takamichi Yamakoshi, Tokyo (JP); Norihiro Tanabe, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 15/097,058

(22) Filed: Apr. 12, 2016

(65) Prior Publication Data

US 2016/0223804 A1 Aug. 4, 2016

Related U.S. Application Data (63) Continuation of application No. 14/200,835, filed on Mar. 7, 2014, now Pat. No. 9,341,836.

(30) Foreign Application Priority Data

Mar. 14, 2013 (JP) .................................. 2013-052156

(51) Int. Cl.
| | |
|---|---|
| *G06K 9/00* | (2006.01) |
| *G02B 21/36* | (2006.01) |
| *G02B 7/34* | (2006.01) |
| *G02B 21/24* | (2006.01) |

(52) U.S. Cl.
CPC ............. *G02B 21/365* (2013.01); *G02B 7/34* (2013.01); *G02B 21/245* (2013.01); *G02B 21/247* (2013.01); *G02B 21/361* (2013.01)

(58) Field of Classification Search
CPC .. G02B 21/365; G02B 21/361; G02B 21/245; G02B 21/247; G02B 7/34
See application file for complete search history.

(56) References Cited

U.S. PATENT DOCUMENTS

| | | | |
|---|---|---|---|
| 6,677,565 B1 * | 1/2004 | Wahl ....................... | G02B 7/346 250/201.3 |
| 7,719,408 B2 * | 5/2010 | DeWard .................. | B60R 11/04 340/425.5 |
| 7,756,305 B2 * | 7/2010 | Price .................. | G01N 21/6458 128/922 |

(Continued)

*Primary Examiner* — Howard D Brown, Jr.
(74) *Attorney, Agent, or Firm* — Sheridan Ross P.C.

(57) ABSTRACT

A digital microscope apparatus includes a first imaging unit including a first imaging device and a first optical system including an objective lens configured to enlarge first and second images of a preparation that holds a sample, the first image being formed on the first device through the first system, a second imaging unit including a second optical system that is branched from the first system and has a depth of field larger than the first system and a second imaging device on which the second image is formed through the second system, and a controller configured to calculate a provisional in-focus position of the lens based on the second image, determine an area of the first device, from which the first image is read, and search for, based on the read image, an in-focus position of the lens in a predetermined range based on the provisional in-focus position.

21 Claims, 9 Drawing Sheets

(56) References Cited

U.S. PATENT DOCUMENTS

| | | | |
|---|---|---|---|
| 2002/0005496 A1* | 1/2002 | Sakamoto | G03F 7/70558 250/548 |
| 2007/0016373 A1* | 1/2007 | Hunter | G01N 15/1475 702/19 |
| 2007/0153085 A1* | 7/2007 | Chang | B60R 1/00 348/148 |
| 2009/0067828 A1* | 3/2009 | Ono | G02B 7/102 396/128 |
| 2009/0196526 A1* | 8/2009 | Schmid | G01N 15/042 382/278 |
| 2009/0295181 A1* | 12/2009 | Lawlor | B60R 1/12 296/1.11 |
| 2009/0303321 A1* | 12/2009 | Olson | G02B 21/002 348/79 |
| 2010/0027856 A1* | 2/2010 | Olson | G02B 21/002 382/128 |
| 2013/0300920 A1* | 11/2013 | Nakamura | H04N 5/2254 348/360 |
| 2014/0152793 A1* | 6/2014 | Staker | G02B 21/361 348/79 |
| 2014/0152888 A1* | 6/2014 | Staker | H04N 5/2251 348/373 |
| 2014/0247390 A1* | 9/2014 | Ohsumi | B60R 11/04 348/373 |
| 2014/0267675 A1* | 9/2014 | Matsunobu | H04N 7/183 348/80 |
| 2014/0292813 A1* | 10/2014 | Takayama | G02B 21/367 345/634 |
| 2014/0292814 A1* | 10/2014 | Tsujimoto | G06T 11/60 345/636 |
| 2014/0313337 A1* | 10/2014 | Devota | B60R 11/04 348/148 |
| 2014/0368726 A1* | 12/2014 | Gladnick | G01B 11/0608 348/349 |
| 2015/0022651 A1* | 1/2015 | Wu | G02B 21/361 348/79 |
| 2015/0309298 A1* | 10/2015 | Nagai | G02B 7/28 359/363 |
| 2016/0006911 A1* | 1/2016 | Kimura | H04N 13/0239 348/47 |

* cited by examiner

DIGITAL MICROSCOPE APPARATUS, METHOD OF SEARCHING FOR IN-FOCUS POSITION THEREOF, AND PROGRAM

CROSS REFERENCE TO RELATED APPLICATIONS

This application is a continuation application and claims the benefit of U.S. patent application Ser. No. 14/200,835 filed Mar. 7, 2014, which claims the benefit of Japanese Patent Application JP 2013-052156 filed Mar. 14, 2013, the entire contents of which are incorporated herein by reference.

BACKGROUND

The present disclosure relates to a digital microscope apparatus that captures an enlarged image of a sample such as a living body sample as an enlarged image, and to a method of searching for an in-focus position thereof and a program.

In the past, in order to observe the whole of a sample with use of a digital microscope apparatus, images of small areas that partition an area containing a sample on a glass slide are captured by a enlarging imaging system and such images of the respective small areas are connected to one another to generate one large image.

For a focusing system in which an objective lens of the enlarging imaging system is focused on a pathological sample serving as an imaging target, autofocusing (AF) is adopted. For example, the following autofocusing is disclosed: a focal position of the objective lens in the enlarging imaging system is moved in an optical axis direction at predetermined intervals, images are captured at the respective moved positions, and a position at which an image having the highest contrast in the captured images is captured is detected as an in-focus position (see, for example, Japanese Patent Application Laid-open No. 2011-197283). This type of focusing system is called "contrast AF."

Although the contrast AF provides relatively high accuracy in focal point, the contrast AF performs repetitive movements and evaluations of the focal position of the objective lens in order to search for the optimal focal position. Consequently, it takes a relatively long time to obtain the optimal focal position.

In this regard, a microscope apparatus that adopts a "phase difference AF" in which light taken through an objective lens is split into two light beams by a splitter lens and the position and direction of a focal point is determined based on the interval between two formed images is also disclosed (see, for example, Japanese Patent Application Laid-open No. 2011-090222). The phase difference AF can provide a focal position at higher speed than the contrast AF without the search for a focal position. Conversely, there is a possibility that the accuracy is lowered due to the size of an object within the imaging surface or due to the number of tissues.

SUMMARY

In the digital microscope apparatus, images of a lot of samples have been requested to be acquired with high quality and at high speed as much as possible, but the request is not met sufficiently with respect to focusing processing and the like.

In view of the circumstances as described above, it is desirable to provide a digital microscope apparatus, a method of searching for an in-focus position thereof, and a program that are capable of performing focusing processing at high speed and with high accuracy.

According to an embodiment of the present disclosure, there is provided a digital microscope apparatus including a first imaging unit including a first optical system and a first imaging device, the first optical system including an objective lens configured to enlarge first and second images of a preparation that holds a sample, the first image being formed on the first imaging device through the first optical system, a second imaging unit including a second optical system that is branched from the first optical system and has a depth of field larger than the first optical system and a second imaging device on which the second image is formed through the second optical system, and a controller configured to calculate a provisional in-focus position of the objective lens based on the second image captured by the second imaging unit, to determine an area of the first imaging device of the first imaging unit, the first image being read from the area, and to search for, based on the first image read from the area of the first imaging device, an in-focus position of the objective lens in a predetermined range determined using the provisional in-focus position as a reference.

In the present disclosure, an in-focus position in a predetermined range determined using a provisional in-focus position as a reference is searched for in the image read from a partial area of the first imaging device of the first imaging unit. With this configuration, it is possible to reduce a time period for reading an image from the first imaging device and to search for an in-focus position at high speed.

The controller may be configured to determine a position of an image of the sample based on the second image captured by the second imaging unit and to determine, based on the determination results, the area of the first imaging device of the first imaging unit, the first image being read from the area. With this configuration, it is possible to search for an in-focus position in an image of a sample portion and to improve the accuracy of searching for an in-focus position.

The controller may be configured to verify accuracy of the provisional in-focus position based on the second image captured by the second imaging unit and to determine, based on the verification results, a necessity of searching for an in-focus position based on the first image read from the area of the first imaging device. With this configuration, in the case where the accuracy of the provisional in-focus position is sufficient, there is no need to search for an in-focus position based on the first image read from the area of the first imaging device, and it is possible to use the provisional in-focus position as a final in-focus position. In other words, by searching for an in-focus position based on the first image read from the area of the first imaging device only in the case where the accuracy of the provisional in-focus position is not sufficiently ensured, it is possible to improve the general efficiency.

The controller may be configured to read an image within a total angle of view of the first imaging device of the first imaging unit in a case where the controller fails to determine the position of the image of the sample and to search for the in-focus position based on the image within the total angle of view. With this configuration, it is possible to avoid a failure to search for an in-focus position due to performing a search for an in-focus position in an image of a portion that includes no sample.

In the digital microscope apparatus according to this embodiment, the second imaging unit may be configured to capture a phase difference image.

According to an embodiment of the present disclosure, there is provided a method of searching for an in-focus position of a digital microscope, including preparing a first imaging unit and a second imaging unit, the first imaging unit including a first optical system and a first imaging device, the first optical system including an objective lens configured to enlarge first and second images of a preparation that holds a sample, the first image being formed on the first imaging device through the first optical system, the second imaging unit including a second optical system that is branched from the first optical system and has a depth of field larger than the first optical system and a second imaging device on which the second image is formed through the second optical system, calculating a provisional in-focus position of the objective lens based on the second image captured by the second imaging unit, determining an area of the first imaging device of the first imaging unit, the first image being read from the area, and searching for, based on the first image read from the area of the first imaging device, an in-focus position of the objective lens in a predetermined range determined using the provisional in-focus position as a reference.

According to an embodiment of the present disclosure, there is provided a program that causes a computer to function as a controller configured to communicate with a first imaging unit and a second imaging unit, the first imaging unit including a first optical system and a first imaging device, the first optical system including an objective lens configured to enlarge first and second images of a preparation that holds a sample, the first image being formed on the first imaging device through the first optical system, the second imaging unit including a second optical system that is branched from the first optical system and has a depth of field larger than the first optical system and a second imaging device on which the second image is formed through the second optical system, to calculate a provisional in-focus position of the objective lens based on the second image captured by the second imaging unit, to determine an area of the first imaging device of the first imaging unit, the first image being read from the area, and to search for, based on the first image read from the area of the first imaging device, an in-focus position of the objective lens in a predetermined range determined using the provisional in-focus position as a reference.

As described above, according to the present disclosure, it is possible to perform focusing processing at high speed and with high accuracy.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

Typical Example

First, a typical digital microscope apparatus and a focusing system thereof will be described.

In the digital microscope apparatus, images of a cellular tissue or the like on a pathological slide using a enlarging optical system are enlarged and captured by an imaging device such as a CMOS (Complementary Metal Oxide Semiconductor) sensor, and the captured images are connected to one another to form a large image of the sample. Because the depth of field of the enlarging optical system is very small (e.g., about 1 µm), there is a need to align a focal position in such a way that the focusing state of a thick cellular tissue is best. Such alignment of a focal position is performed by relatively driving a stage holding a pathological slide (preparation) in an optical axis direction of an objective lens of an enlarging optical system.

Typical examples of a system for aligning a focal position include a contrast AF (hill climbing method). In the contrast AF, the depth of field of the enlarging optical system is used as a unit for searching for a focal position. Because the depth of field of the enlarging optical system of the digital microscope apparatus is very small, there is a need to repeat movement of the stage and capturing of an image many times in order to cover the search range. For example, in the case where the search range of the pathological slide (preparation) is about ±100 µm and the depth of field of the enlarging optical system is about 1 µm, there is a need to perform capturing of an image about 200 times. In the case where the frame rate of the imaging unit is 10 fps, it takes about 20 seconds to align the focal position by the contrast AF eventually. In other words, it takes at least about 20 seconds to capture an image for each pathological slide (preparation).

Figure 1:
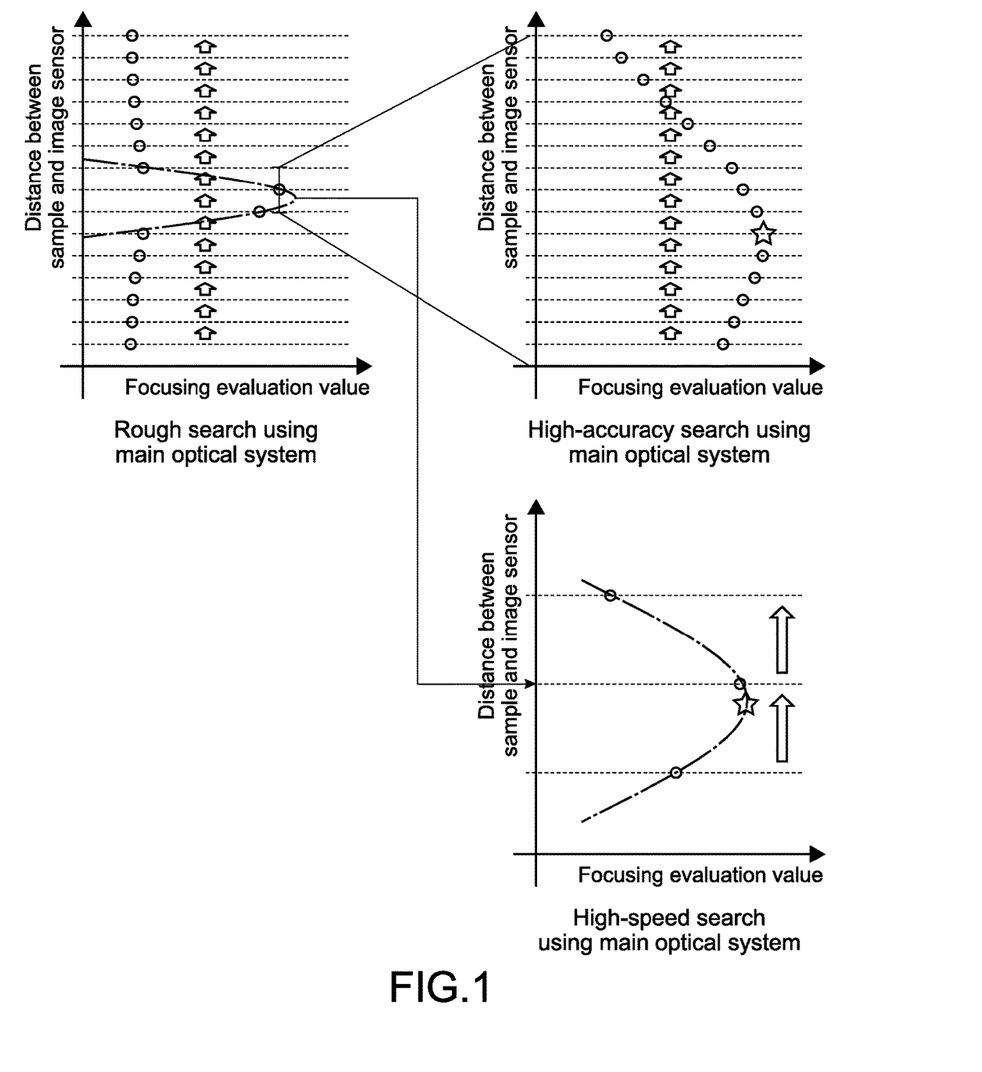
FIG. 1 is a diagram for explaining a typical example of a focusing method.

Examples of a method of performing the contrast AF at high speed include two-staged contrast AF that roughly searches for an in-focus position at intervals of, for example, 10 µm, and then, searches for an in-focus position around the searched in-focus position at intervals of 1 µm in a range of ±10 µm, as shown in FIG. 1. Alternatively, a method in which curve fitting is performed using a combination of reciprocals of focusing evaluation values of 3 or more in-focus positions in a range of ±10 µm to obtain a predetermined curve, and a focal position with the smallest reciprocal on the predetermined curve is calculated has been known. In this case, because it is possible to reduce the number of reading of an image at the second stage to 3 times at the minimum, the contrast AF can be performed at higher speed.

As described above, in the contrast AF, the optical system for capturing an enlarged image is used continuously. On the other hand, there exist methods in which another optical system (sub-optical system) that is branched from the optical system for capturing an enlarged image (main optical system) is used to detect an in-focus position. One of the methods is a phase difference AF. In the phase difference AF, light taken through the objective lens is split into two light beams by a splitter lens and the position and direction of a focal point is determined based on the interval between two formed images. The depth of field of the sub-optical system for the phase difference AF may be sufficiently larger than that of the main optical system. Specifically, in the phase difference AF, because there is no need to search for a focal position, it is possible to detect the optimal focal position at higher speed than the contrast AF. Conversely, the phase difference AF has a fundamental problem such as lower focusing accuracy than that of the contrast AF. In particular, the accuracy tend to be lowered in the case where a cellular tissue in an imaging surface is too small or the case where staining is insufficient.

Figure 2:
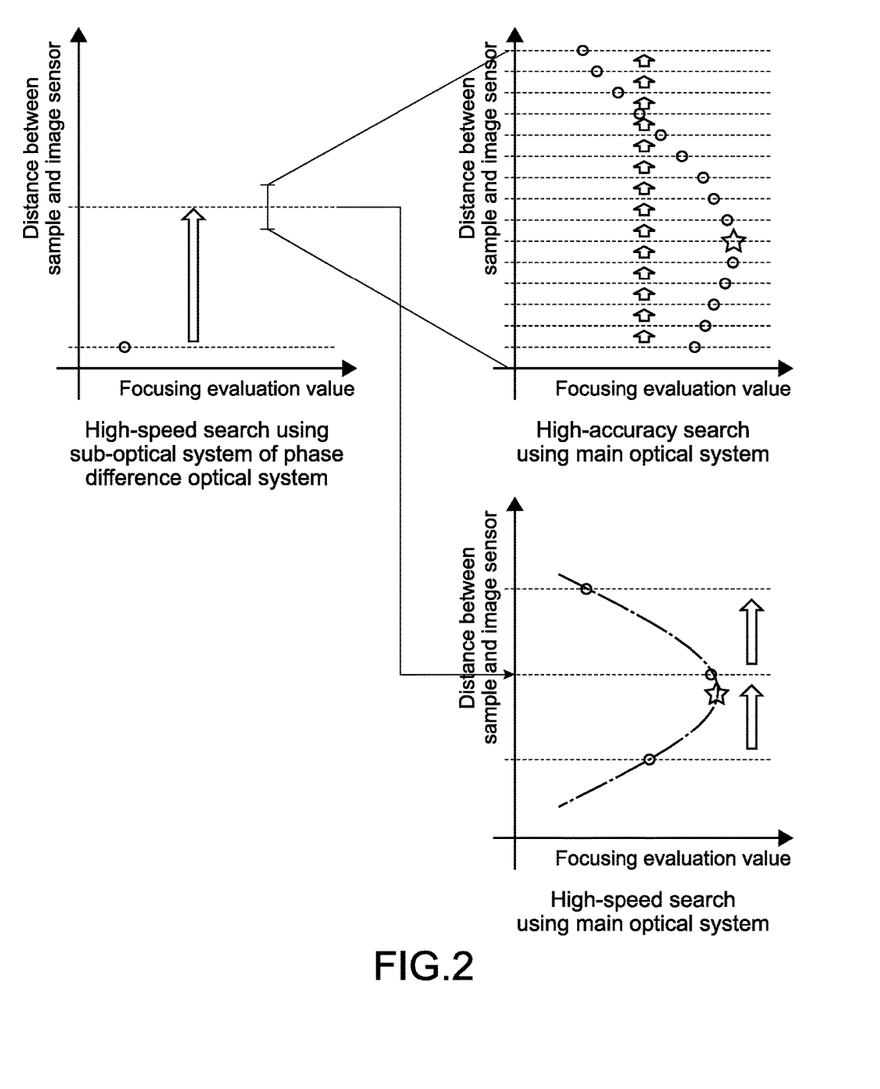
FIG. 2 is a diagram for explaining another typical example of the focusing method.

Furthermore, there exists a method in which the phase difference AF and the contrast AF are combined. As shown in FIG. 2, in the combination-type AF, a provisional in-focus position is obtained by the phase difference AF and then, an in-focus position is searched for in a range of a predetermined distance by the contrast AF (hill climbing method) using the provisional in-focus position as a reference. According to the combination-type AF, because it is possible to significantly reduce the number of reading of an image at the first stage as compared to the two-staged contrast AF described above, it is expected to significantly increase the speed. Moreover, by reducing the number of reading of an image using curve fitting in the contrast AF performed at the second stage, it is possible to increase the speed more.

However, there is a limit on the increase in speed as long as reading of an image from the imaging unit of the main optical system is repeated. Specifically, the frame rate of the imaging unit of the main optical system is expected to be an obstacle to a request of increase in speed.

In this regard, in the digital microscope apparatus according to this embodiment, in a search for an in-focus position in a predetermined range determined by using the provisional in-focus position calculated by the phase difference AF as a reference, a time period for reading an image is shortened by restricting a reading area of the imaging device, and focusing processing is performed at significantly higher speed.

Hereinafter, the digital microscope according to a first embodiment of the present disclosure will be described.

First Embodiment

Figure 3:
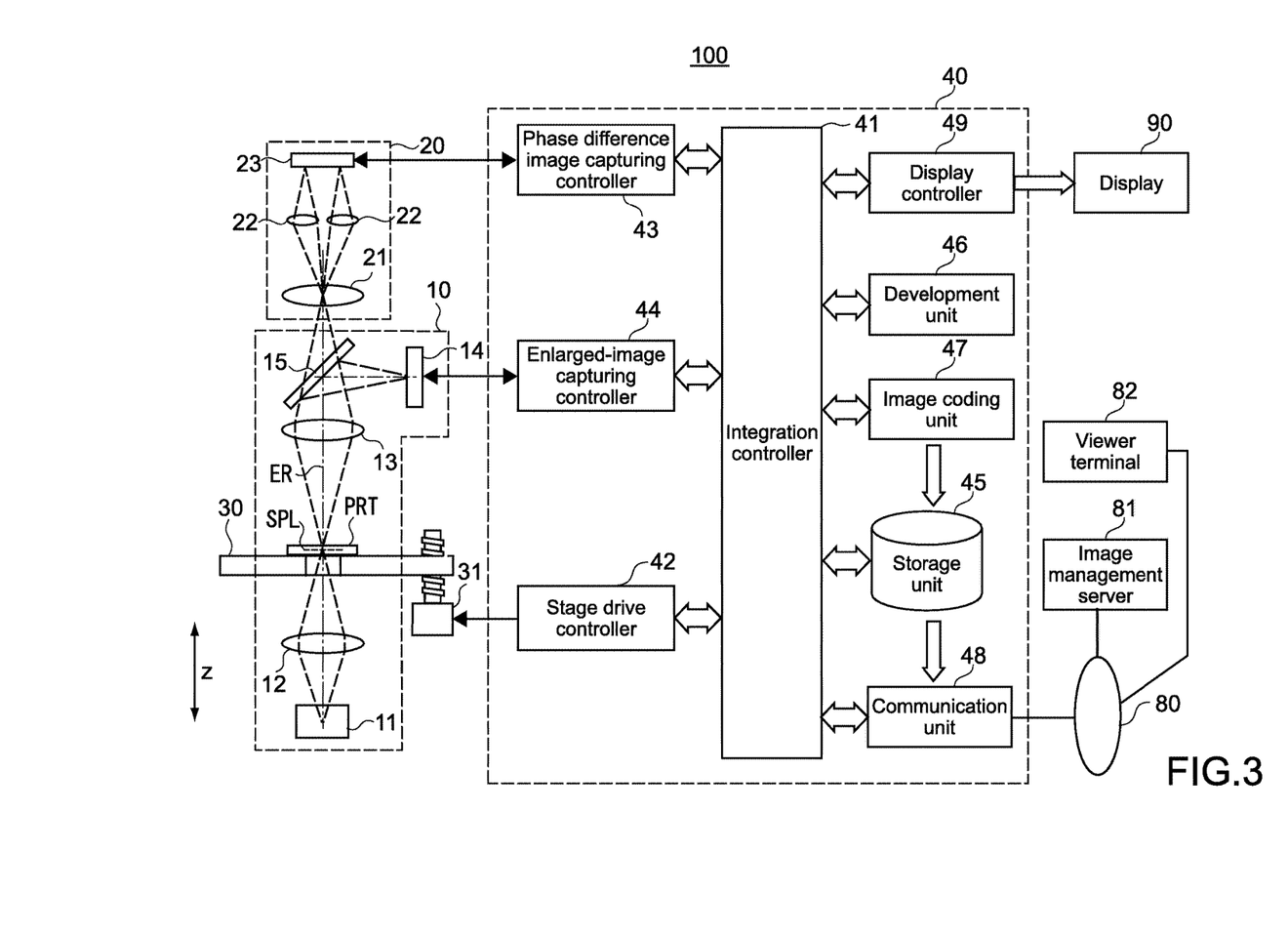
FIG. 3 is a diagram showing the entire configuration of a digital microscope apparatus according to an embodiment of the present disclosure.

FIG. 3 is a diagram showing the entire configuration of a digital microscope apparatus 100 according to a first embodiment.
(Entire Configuration)

The digital microscope apparatus 100 includes an enlarged-image capturing unit 10 (first imaging unit) being an imaging unit of a main optical system, a phase difference image capturing unit 20 (second imaging unit) being an imaging unit of a sub-optical system, a stage 30, and a controller 40. It should be noted that although an illustration is omitted, the digital microscope apparatus 100 may include a thumbnail image capturing unit that captures an image of the entire preparation PRT on which a sample SPL is provided.

The enlarged-image capturing unit 10 captures an image in which the sample SPL on the preparation PRT is enlarged at a predetermined magnification (hereinafter, the image being referred to as "enlarged image" or "observation image").

The phase difference image capturing unit 20 captures a phase difference image containing information on the amount and orientation of a displacement in an optical axis direction between a focal point of an objective lens 13 of the enlarged-image capturing unit 10 and the sample SPL on the preparation PRT.

The preparation PRT is placed on the stage 30, and the stage 30 moves the preparation PRT to an imaging position of at least the enlarged-image capturing unit 10. The stage 30 is configured to be movable by a stage drive mechanism 31 in a direction of an optical axis (z-axis direction) of the objective lens 13 of the enlarged-image capturing unit 10 and also in a direction (x-axis direction and y-axis direction) orthogonal to the direction of the optical axis. Additionally, the stage 30 is desirably movable also in a direction inclining with respect to a surface orthogonal to the direction of the optical axis.

It should be noted that the preparation PRT is obtained by fixing the sample SPL to a glass slide by a predetermined fixing method. The sample SPL is a living body sample that includes tissue slices of connective tissues such as blood, epithelial tissues, and tissues including both of the above tissues, or the like or includes smear cells. The tissue slices or smear cells are subjected to various types of staining as necessary. Examples of staining include not only general staining represented by HE (hematoxylin-eosin) staining, Giemsa staining, Papanicolaou staining, Ziehl-Neelsen staining, and Gram staining but also fluorescent staining such as FISH (Fluorescence In-Situ Hybridization) and an enzyme antibody technique.

It should be noted that although an illustration is omitted, the digital microscope apparatus 100 is additionally equipped with a preparation stock loader that stores the preparations PRT each containing the sample SPL and loads the stored preparations PRT one by one onto the stage 30.

Next, the details of the enlarged-image capturing unit 10, the phase difference image capturing unit 20, and the controller 40 will be described.
(Enlarged-Image Capturing Unit 10)

As shown in FIG. 3, the enlarged-image capturing unit 10 includes a light source 11, a condenser lens 12, the objective lens 13, an imaging device 14 (first imaging device) and a beam splitter 15.

The light source 11 is configured to apply bright field illumination light. The light source 11 is provided on a surface of the stage 30, which is on the opposite side to the surface on which the preparation is arranged. A light source that applies dark field illumination light (not shown) is provided at a position different from the position at which the light source 11 is provided (e.g., side of the surface on which the preparation is arranged, hereinafter, the surface being also referred to as preparation arrangement surface).

The condenser lens 12 collects the bright field illumination light applied from the light source 11 or the dark field illumination light applied from the light source for dark field illumination, and guides the illumination light to the preparation PRT on the stage 30. The condenser lens 12 is arranged between the light source 11 and the stage 30, with the normal line of a reference position of the enlarged-image capturing unit 10 on the preparation arrangement surface being as an optical axis ER.

The objective lens 13 is arranged on the preparation arrangement surface side of the stage 30, with the normal line of a reference position of the enlarged-image capturing unit 10 on the preparation arrangement surface being as an optical axis ER. In the enlarged-image capturing unit 10, the objective lens 13 is appropriately replaced, so that the image of the sample SPL can be enlarged and captured at various magnifications. Transmitted light that has been transmitted through the preparation PRT arranged on the stage 30 is collected by the objective lens 13 and reaches the beam splitter 15.

The beam splitter 15 splits the transmitted light that has been transmitted through the objective lens 13 into reflected light that proceeds to the imaging device 14 of the enlarged-image capturing unit 10 and transmitted light that proceeds to a field lens 21 in the phase difference image capturing unit 20.

On the imaging device 14, an image of an imaging range in a small area on the preparation arrangement surface of the stage 30 is formed in accordance with a pixel size of the imaging device 14 and a magnification of the objective lens 13.

(Phase Difference Image Capturing Unit 20)

As shown in FIG. 3, the phase difference image capturing unit 20 includes the field lens 21, a separator lens 22, and an imaging device 23 (second imaging device).

The field lens 21 collects the reflected light that has been transmitted through the beam splitter 15 and guides the reflected light to the separator lens 22 that is provided behind the field lens 21 (on a traveling direction side of the reflected light).

The separator lens 22 divides the light beam guided from the field lens 21 into two light beams. The divided light beams form a set of subject images on an imaging surface of the imaging device 23 provided behind the separator lens 22 (on the traveling direction side of the reflected light).

On the imaging device 23, a set of subject images that has been transmitted through the separator lens 22 is formed. A phase difference exists between the set of formed subject images because light beams in various directions, which are emitted from the field lens 21, enter the separator lens 22. In the following description, the set of subject images is referred to as a "phase difference image."

It should be noted that the beam splitter 15 is provided between the objective lens 13 and the imaging device 14 in the above description, but a light beam branching unit that branches a light beam is not limited to the beam splitter. A movable mirror and the like may be used as the beam splitter.

Additionally, in the above description, the phase difference image capturing unit 20 is arranged on the optical axis ER of the objective lens 13, and the imaging device 14 of the enlarged-image capturing unit 10 is arranged at a position on which the reflected light split by the beam splitter 15 is incident. Conversely, the imaging device 14 of the enlarged-image capturing unit 10 may be arranged on the optical axis ER of the objective lens 13 and the phase difference image capturing unit 20 may be arranged at a position on which the reflected light split by the beam splitter 15 is incident.

Further, in the above-mentioned description, the configuration in which the field lens, the separator lens, and the imaging device are provided is shown as a phase difference AF optical system in the phase difference image capturing unit 20, but the present disclosure is not limited to such an example. Such a phase difference AF optical system may be a different optical system in which equivalent functions can be achieved by using a condenser lens and twin lenses instead of the field lens, the separator lens, and the like.

Furthermore, each of the imaging devices provided to the enlarged-image capturing unit 10 and the phase difference image capturing unit 20 may be a one-dimensional imaging device (line sensor) or a two-dimensional imaging device (area sensor).

(Controller 40)

The controller 40 includes an integration controller 41, a stage drive controller 42, a phase difference image capturing controller 43, an enlarged-image capturing controller 44, a storage unit 45, a development unit 46, an image coding unit 47, a communication unit 48, and a display controller 49.

The integration controller 41 is constituted of hardware elements of a computer including, for example, a CPU (Central Processing Unit), a ROM (Read Only Memory), and a RAM (Random Access Memory). Alternatively, the integration controller 41 may be constituted of a dedicated IC such as an FPGA (field programmable gate array). The integration controller 41 exchanges various signals with the stage drive controller 42, the phase difference image capturing controller 43, the enlarged-image capturing controller 44, the storage unit 45, the development unit 46, the image coding unit 47, the communication unit 48, and the display controller 49, and executes various types of arithmetic processing and control to acquire an enlarged image. Various programs and various types of data for the various types of arithmetic processing and control are loaded to the RAM. The CPU executes the programs loaded to the RAM. The ROM stores the programs and data loaded to the RAM.

The stage drive controller 42, the phase difference image capturing controller 43, and the enlarged-image capturing controller 44 may be each constituted of hardware elements of a computer including, for example, a CPU, a ROM, and a RAM or may be constituted of a dedicated IC such as an FPGA.

The development unit 46 and the image coding unit 47 are each constituted of hardware elements of a computer including, for example, a CPU, a ROM, and a RAM. Alternatively, the development unit 46 and the image coding unit 47 may be constituted of a GPU (Graphics Processing Unit).

When receiving an instruction from the integration controller 41 to capture an enlarged image, the stage drive controller 42 drives the stage drive mechanism 31 to move the stage 30 in a stage surface direction in such a way that the small area of the instructed sample SPL falls within the imaging range of the imaging device 14. The stage drive controller 42 drives the stage drive mechanism 31 to move the stage 30 in the z-axis direction in such a way that the objective lens 13 is focused on the sample SPL.

The phase difference image capturing controller 43 acquires signals of the set of phase difference images that are formed on the imaging surface of the imaging device 23 provided to the phase difference image capturing unit 20, and supplies the signals to the integration controller 41. The integration controller 41 calculates the amount of defocus and the orientation of defocus of the focal point of the objective lens 13 of the enlarged-image capturing unit 10 with respect to the sample SPL, based on the distance between the set of phase difference images that are acquired from the phase difference image capturing controller 43. Based on those pieces of information, the integration controller 41 calculates a provisional in-focus position. Further, the integration controller 41 detects an area in which a sample exists or an area in which a cellular tissue of the sample is dense in at least one of the phase difference images that are acquired from the phase difference image capturing controller 43, and controls the enlarged-image capturing controller 44 in such a way that a reading area of an image in the imaging device 14 is restricted to the detected area.

The enlarged-image capturing controller 44 generates, based on the signal corresponding to an enlarged image of each small area that is formed on the imaging surface of the imaging device 14 of the enlarged-image capturing unit 10, RAW data corresponding to the enlarged image of each small area and supplies the RAW data to the integration controller 41. Here, the "small area" is obtained by partitioning the entire area of the sample SPL held by the preparation PRT into a plurality of areas in a mesh pattern, the plurality of areas each having a size corresponding to the field of view of the enlarged-image capturing unit 10.

The integration controller 41 supplies the RAW data of each small area, which has been acquired from the enlarged-image capturing controller 44, to the development unit 46, so that the development unit 46 executes development processing. The integration controller 41 connects the data of the enlarged images of respective small areas, which have been developed by the development unit 46, to generate a large image for each sample SPL, and performs processing of dividing the generated large image for each sample SPL into units of a predetermined resolution that is called tile, and other processing. Further, the integration controller 41 supplies each of the generated tiles to the image coding unit 47 and causes the image coding unit 47 to generate image data in a predetermined compression coding format and the storage unit 45 to store the image data.

The storage unit 45 stores various types of setting information or programs for controlling the digital microscope apparatus 100, tile groups in a predetermined compression coding format, and the like.

The development unit 46 develops the RAW data of the enlarged image of each small area that has been captured by the enlarged-image capturing unit 10.

The image coding unit 47 codes the image data for each tile in a predetermined image compression format. Here, for example, JPEG (Joint Photographic Experts Group) is adopted as the image compression format. As a matter of course, compression coding formats other than JPEG may be adopted.

The tiles stored in the storage unit 45 are accumulated in an image management server 81 through a network 80 by the communication unit 48. In response to a request from a viewer terminal 82, the image management server 81 sends one or more appropriate tiles to the viewer terminal 82. The viewer terminal 82 generates an enlarged image for display by using the one or more tiles acquired from the image management server 81 and displays the enlarged image on a display of the viewer terminal 82.

The display controller 49 generates screen data to be displayed on a display 90 that is connected to the digital microscope apparatus 100.

(Regarding Focusing System)

In the digital microscope apparatus 100 according to this embodiment, first, an in-focus position is calculated by the phase difference AF and whether or not the accuracy of the in-focus position is ensured is determined. In the case where it is determined that the accuracy is ensured, the stage 30 is moved in the z-axis direction in such a way that the objective lens 13 is focused on the in-focus position calculated by the phase difference AF and an enlarged image is captured by the enlarged-image capturing unit 10. On the other hand, in the case where it is determined that the accuracy is not ensured, the in-focus position calculated by the phase difference AF is used as a provisional in-focus position and an enlarged image captured by the enlarged-image capturing unit 10 is used to search for an in-focus position by the contrast AF in a predetermined range determined using the provisional in-focus position as a reference.

Further, in the digital microscope apparatus 100 according to this embodiment, by restricting a reading area of the imaging device 14 to shorten the time period of reading an image in the search for an in-focus position in a predetermined range determined using the provisional in-focus position calculated by the phase difference AF as a reference, the in-focus position is searched for at significantly higher speed.

(Function of Integration Controller 41)

Next, the integration controller 41 that performs the focusing control will be described.

Figure 4:
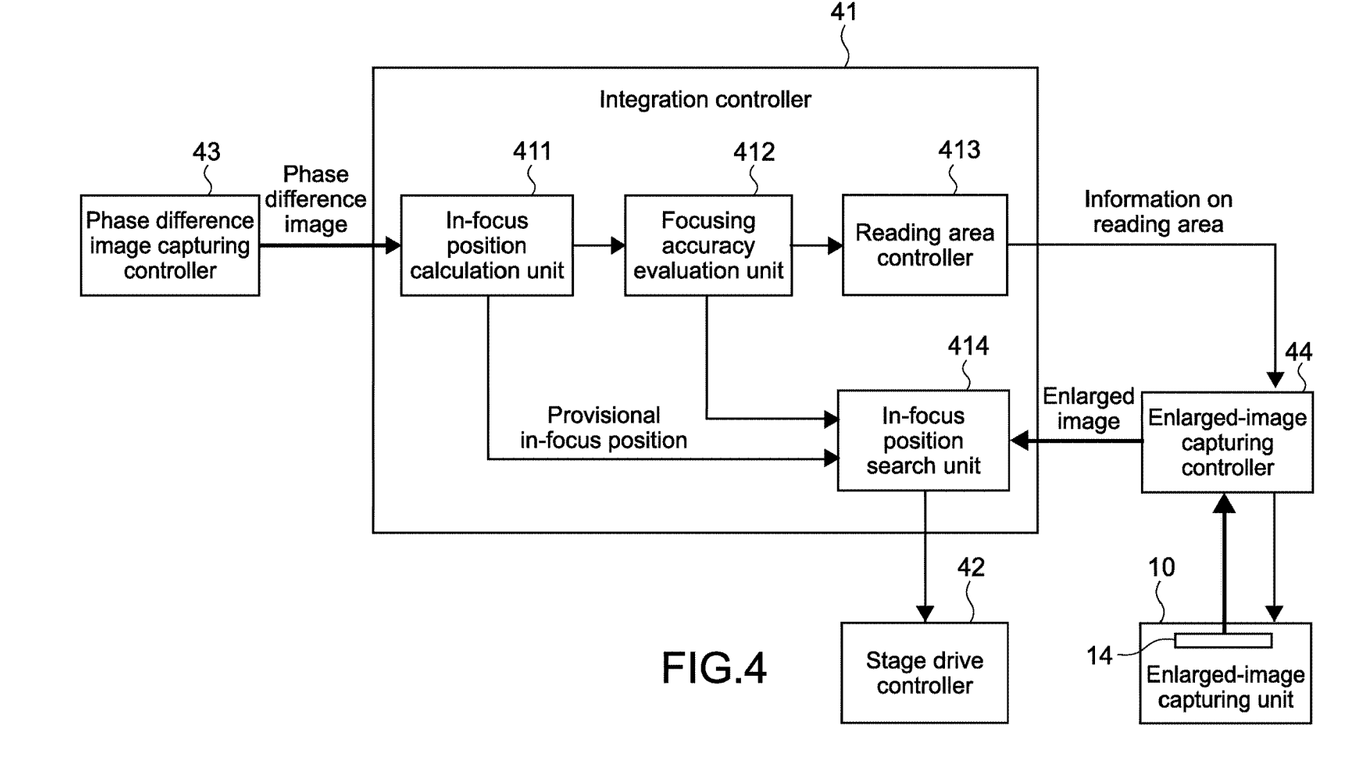
FIG. 4 is a functional block diagram of an integration controller.

FIG. 4 is a functional block diagram of the integration controller 41.

Figure 5:
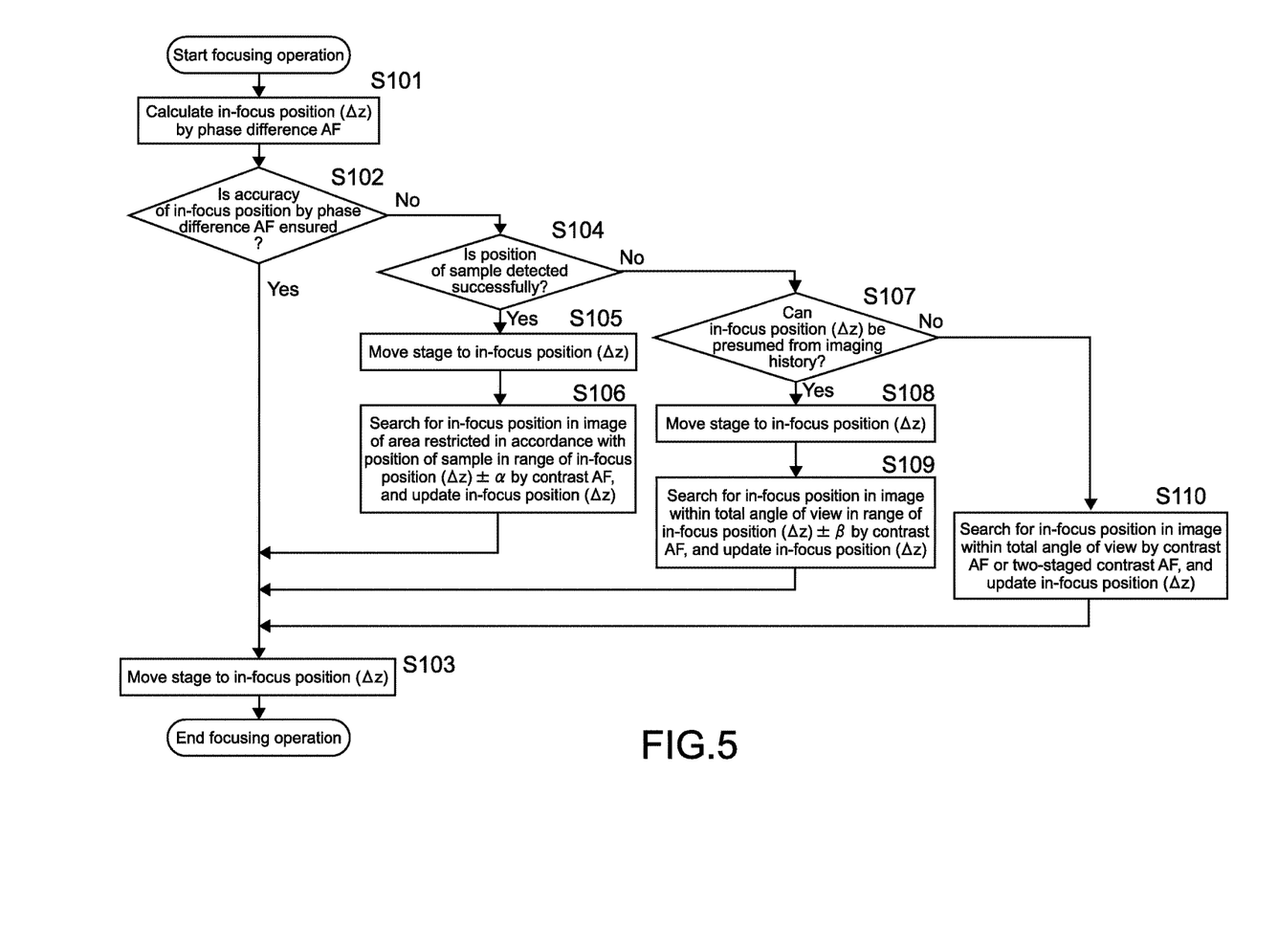
FIG. 5 is a flowchart showing a focusing operation of the integration controller.

FIG. 5 is a flowchart showing a focusing operation of the integration controller 41.

As shown in FIG. 4, the integration controller 41 includes an in-focus position calculation unit 411, a focusing accuracy evaluation unit 412, a reading area controller 413, and an in-focus position search unit 414. Those functions are achieved when a CPU in the integration controller 41 executes a program loaded to a RAM.

First, the in-focus position calculation unit 411 acquires a set of phase difference images from the phase difference image capturing unit 20 via the phase difference image capturing controller 43, obtains phase difference between the phase difference images, and calculates the amount of defocus and the orientation of defocus, which correspond to the distance to the in-focus position, as defocus information based on the phase difference (step S101).

The focusing accuracy evaluation unit 412 verifies the accuracy of the in-focus position based on the phase difference image captured by the phase difference image capturing unit 20 (step S102) and then moves the stage 30 in the z-axis direction based on the defocus information calculated by the in-focus position calculation unit 411 in the case where it is determined that the accuracy is ensured (step S103). After that, the enlarged-image capturing unit 10 captures an enlarged image.

(Method of Verifying Detection Accuracy of in-Focus Position)

Here, the details of the method of verifying detection accuracy of an in-focus position will be described.

Figure 6:
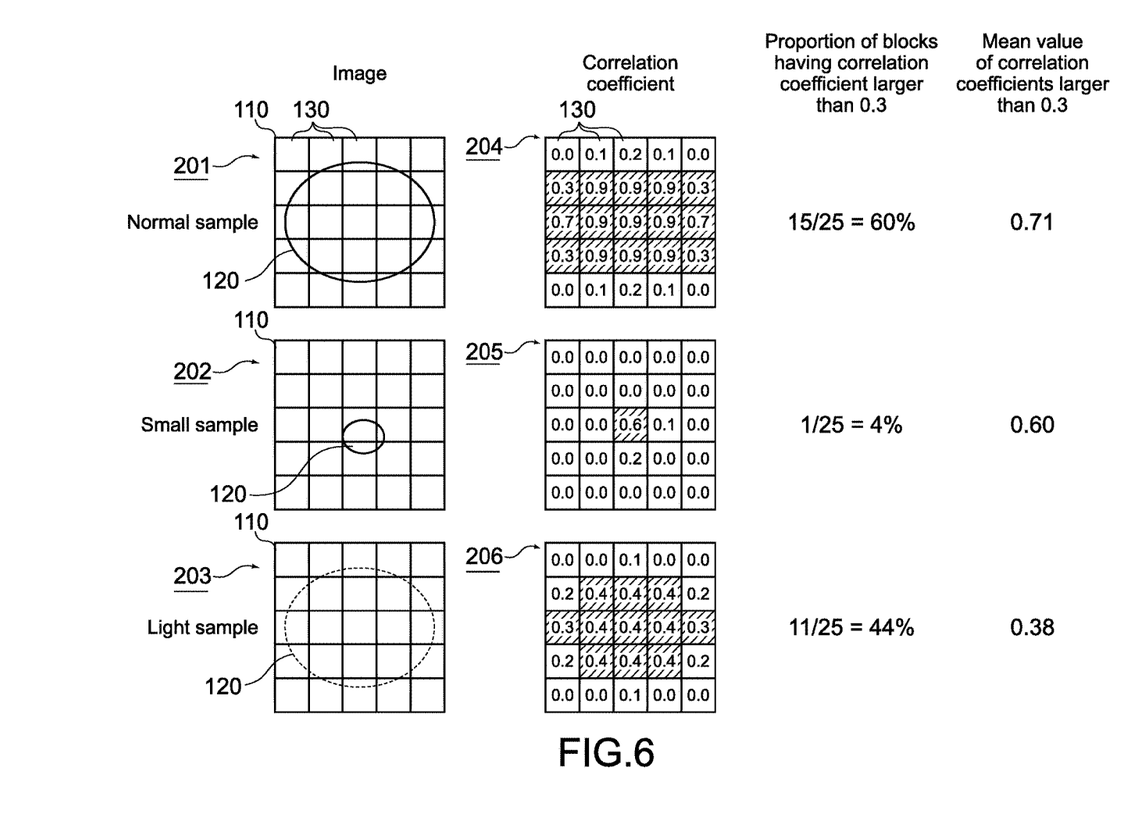
FIG. 6 is a diagram for explaining a method of verifying detection accuracy of an in-focus position.

FIG. 6 is a diagram for explaining the method of verifying detection accuracy of an in-focus position.

In the digital microscope apparatus 100 according to this embodiment, the phase difference image captured by the phase difference image capturing unit 20 is used to verify detection accuracy of an in-focus position. The case where sufficient detection accuracy of an in-focus position is ensured by the phase difference AF represents a case where an image 120 of a sample portion has a certain proportion of area and clearness (density) in an entire image 110 as in an image 201 shown in FIG. 6. In the case where the image 120 of a sample is too small as in an image 202 or the image 120 of a sample is too light as in an image 203, the amount of information that is necessary to identify the identical area on observed surfaces of on two phase difference images formed on the imaging device 23 of the phase difference image capturing unit 20 becomes insufficient, and the detection accuracy of phase difference is lowered.

Here, the entire image 110 is partitioned into blocks 130 of M×N pixels, and the assumption is made that a value obtained by replacing the mean value of the density of the pixel in the block 130 with a correlation coefficient within the range from 0 to 1 is a quantified value of the clearness (density) of the block 130. Therefore, it is represented that the block 130 is more unclear as the correlation coefficient is closer to 0, and the block is clearer as the correlation coefficient is closer to 1.

Numerals 204, 205, and 206 in FIG. 6 represent correlation coefficients of the blocks 130 of the images 201, 202, and 203, respectively.

An image in which the proportion of the number of blocks 130 having the correlation coefficient that is not less than a first threshold value is not less than a second threshold value and the mean value of the correlation coefficients of the blocks 130 having the correlation coefficient that is not less than the first threshold value is not less than a third threshold value is determined as an image in which sufficient detection accuracy of an in-focus position is ensured by the phase difference AF.

For example, the assumption is made that the first threshold value is 0.3, the second threshold value is 40%, and the third threshold value is 0.5.

In the image 201, the proportion of the number of blocks 130 having the correlation coefficient that is not less than the first threshold value (=0.3) is 60%, and the mean value of the correlation coefficients of the blocks 130 having the correlation coefficient that is not less than the first threshold value (=0.3) is 0.71, which is larger than the third threshold value (=0.5). Therefore, the image 201 is determined as an image in which sufficient detection accuracy of an in-focus position is ensured by the phase difference AF.

Next, in the image 202, the mean value of the correlation coefficients of the blocks 130 having the correlation coefficient that is not less than the first threshold value (=0.3) is 0.6, which is larger than the third threshold value (=0.5), but the proportion of the number of blocks 130 having the correlation coefficient that is not less than the first threshold value (=0.3) is 4%. Therefore, the image 202 is determined as an image in which sufficient detection accuracy of an in-focus position is not ensured by the phase difference AF.

Similarly, in the image 203, the proportion of the number of blocks 130 having the correlation coefficient that is not less than the first threshold value (=0.3) is 44%, which is larger than the second threshold value (=40%), but the mean value of the correlation coefficients of the blocks 130 having the correlation coefficient that is not less than the first threshold value (=0.3) is 0.38, which is less than the third threshold value (=0.5). Therefore, the image 203 is determined as an image in which sufficient detection accuracy of an in-focus position is not ensured by the phase difference AF.

What has been described above is the method of verifying detection accuracy of an in-focus position.

In the case where it is determined that the detection accuracy of an in-focus position is not ensured in step S102, the focusing accuracy evaluation unit 412 attempts to detect a position of a sample within an angle of view of the entire phase difference image (step S104).

(Method of Detecting Position of Sample)

The case where the position of a sample needs to be detected represents a case where it is determined that there is a problem in the accuracy of the in-focus position. Therefore, there is no need to perform processing for identifying the position of a sample on an image in which the proportion of the number of blocks 130 having the correlation coefficient that is not less than the first threshold value is not less than the second threshold value, and the mean value of the correlation coefficients of the blocks 130 having the correlation coefficient that is not less than the first threshold value is not less than the third threshold value as in the image 201 shown in FIG. 6.

Therefore, in an image in which it is determined that there is a problem in the accuracy of an in-focus position, the position of the sample may be determined based on the value of the correlation coefficient of each block 130. The reading area of the imaging device 14 of the enlarged-image capturing unit 10 may be restricted in accordance with the position of the sample.

For example, in the image 202 and the image 203 shown in FIG. 6, the blocks 130 having the threshold value that is larger than the first threshold value (=0.3) are determined as the position of the sample. It should be noted that the threshold value for determination does not necessarily have to be the same as the first threshold value used in the verification of the accuracy of the in-focus position at this time.

What has been described above is the method of detecting the position of a sample.

FIG. 4 and FIG. 5 will be described again.

In the case where the position of a sample within an angle of view of the entire phase difference image is detected in step S104, the focusing accuracy evaluation unit 412 moves the stage 30 in the z-axis direction based on the defocus information calculated by the in-focus position calculation unit 411 (step S105) and notifies the reading area controller 413 of the detected position of the sample.

The reading area controller 413 calculates a reading area of the imaging device 14 corresponding to the position of the sample notified from the focusing accuracy evaluation unit 412 and notifies the enlarged-image capturing controller 44 of the information on the reading area. The enlarged-image capturing controller 44 performs control to restrict the area of an image read from the imaging sensor 14 of the enlarged-image capturing unit 10 based on the information on the reading area notified from the reading area controller 413.

Most CMOS sensors used for the imaging device 14 are capable of performing band reading. The band reading is a function that is capable of controlling the reading range in the x-axis direction or the y-axis direction. The band reading function can be used to restrict the reading area of the imaging device 14 in accordance with the position of the sample detected by the focusing accuracy evaluation unit 412.

Figure 7:
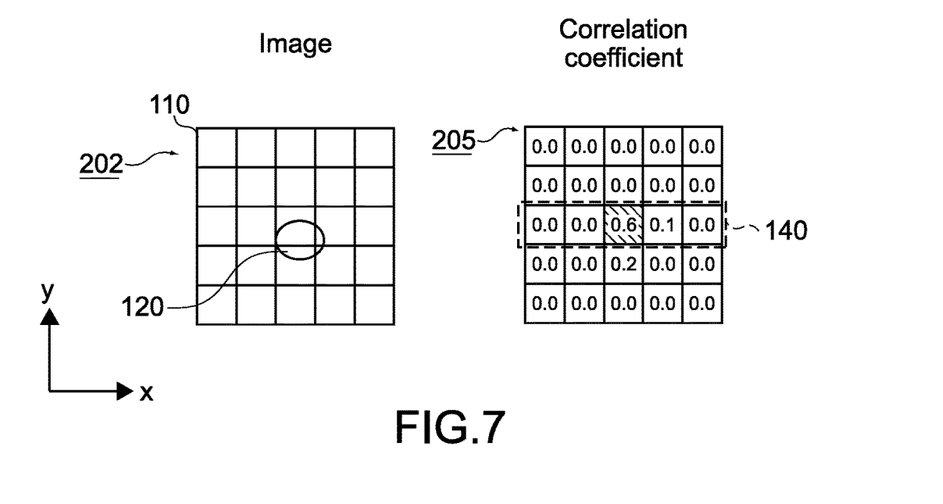
FIG. 7 is a diagram showing a specific example in which a reading area of the imaging device is restricted.

FIG. 7 is a diagram showing a specific example in which the band reading function is used to restrict the reading area of the imaging device. As shown in FIG. 7, in the case where it is determined that some blocks 130 include the image 120 of a sample, a band-shaped portion 140 including the blocks 130 may be read using the band reading function.

Figure 8:
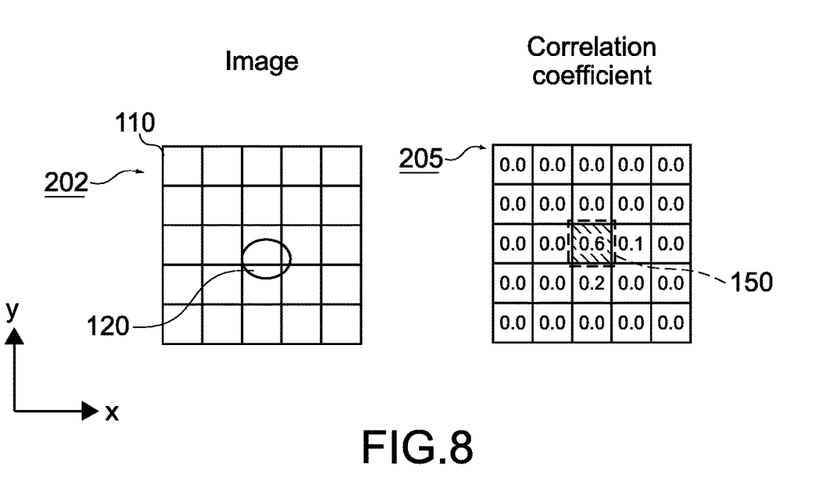
FIG. 8 is a diagram showing another specific example in which a reading area of the imaging device is restricted.

Further, as shown in FIG. 8, if the reading range can be restricted in the x-axis direction and the y-axis direction from the imaging device, a portion 150 corresponding to the block obtained by controlling the blocks in two axial directions of the x-axis direction and the y-axis direction may be read.

As described above, because an image only needs to be partially read from the imaging device 14, it is possible to significantly reduce the time period of reading an image from the imaging device 14.

FIG. 4 and FIG. 5 will be described again.

The in-focus position search unit 414 is activated in the case where it is determined that the accuracy of the in-focus position is not ensured as a result of the verification of the accuracy of the in-focus position by the focusing accuracy evaluation unit 412 (step S102). The activated in-focus position search unit 414 performs different processing in the case where the detection of the position of the sample has succeeded by the focusing accuracy evaluation unit 412 (Yes in step S104) and in the case where the detection has failed (No in step S104).

Specifically, in the case where the detection of the position of the sample has succeeded by the focusing accuracy evaluation unit 412 (Yes in step S104), the in-focus position search unit 414 acquires, from the enlarged-image capturing controller 44, the enlarged image of the restricted area read from the imaging device 14, and searches for, by the contrast AF, the in-focus position in the enlarged image of the read-restricted area (step S105 and step S106). At this time, the in-focus position detected by the in-focus position calculation unit 411 is used as a provisional in-focus position, and an in-focus position is searched for by the contrast AF in a predetermined ranged obtained using the provisional in-focus position as a reference.

After that, the stage 30 is moved in the z-axis direction in such a way that the in-focus position searched by the in-focus position search unit 414 is aligned with the focal position of the objective lens 13 (step S103). After that, the enlarged-image capturing unit 10 captures an enlarged image.

Further, the case where the focusing accuracy evaluation unit 412 fails to detect the position of the sample (No in step S104) represents, for example, a case where an image of the sample is light. In this case, the accuracy of the in-focus position calculated by the phase difference AF is not ensured. In this regard, the in-focus position search unit 414 determines whether or not the approximate in-focus position with respect to the small area serving as an imaging target at this time can be presumed from the imaging history of the small area, for example (step S107). Regarding an example of at least one small area adjacent to the small area serving as an imaging target at this time, an image of the sample appears over those small areas. In the case where an enlarged image of the at least one small area is already captured, the in-focus position search unit 414 presumes the in-focus position of the small area serving as an imaging target at this time based on the in-focus position obtained when an enlarged image of the at least one adjacent small area is captured. Then, the in-focus position search unit 414 uses the in-focus position as a provisional in-focus position and searches for an in-focus position in a predetermined range determined by using the provisional in-focus position as a reference by the contrast AF (step S108 and step S109). It should be noted that the predetermined range determined by using the provisional in-focus position as a reference may be the same as or different from the predetermined range in step S106.

After that, the stage 30 is moved in the z-axis direction in such a way that the focal position of the objective lens 13 is aligned with the in-focus position searched by the in-focus position search unit 414 (step S103). After that, the enlarged-image capturing unit 10 captures an enlarged image.

Further, in the case where it is difficult to presume the in-focus position (No in step S107), the in-focus position search unit 414 searches for an in-focus position by the contrast AF or the two-staged contrast AF that roughly searches for an in-focus position and then searches for an in-focus position with high accuracy, for example (step S110).

After that, the stage 30 is moved in the z-axis direction in such a way that the focal position of the objective lens 13 is aligned with the in-focus position searched by the in-focus position search unit 414 (step S103). After that, the enlarged-image capturing unit 10 captures an enlarged image.

(Effects of Digital Microscope Apparatus 100 According to this Embodiment)

As described above, according to the digital microscope apparatus 100 according to this embodiment, it is possible to search for an in-focus position by the contrast AF not only in the range in the optical axis direction but also in the restricted range on the observed surface. Accordingly, it is possible to perform focusing processing with high accuracy and at high speed.

Figure 9:
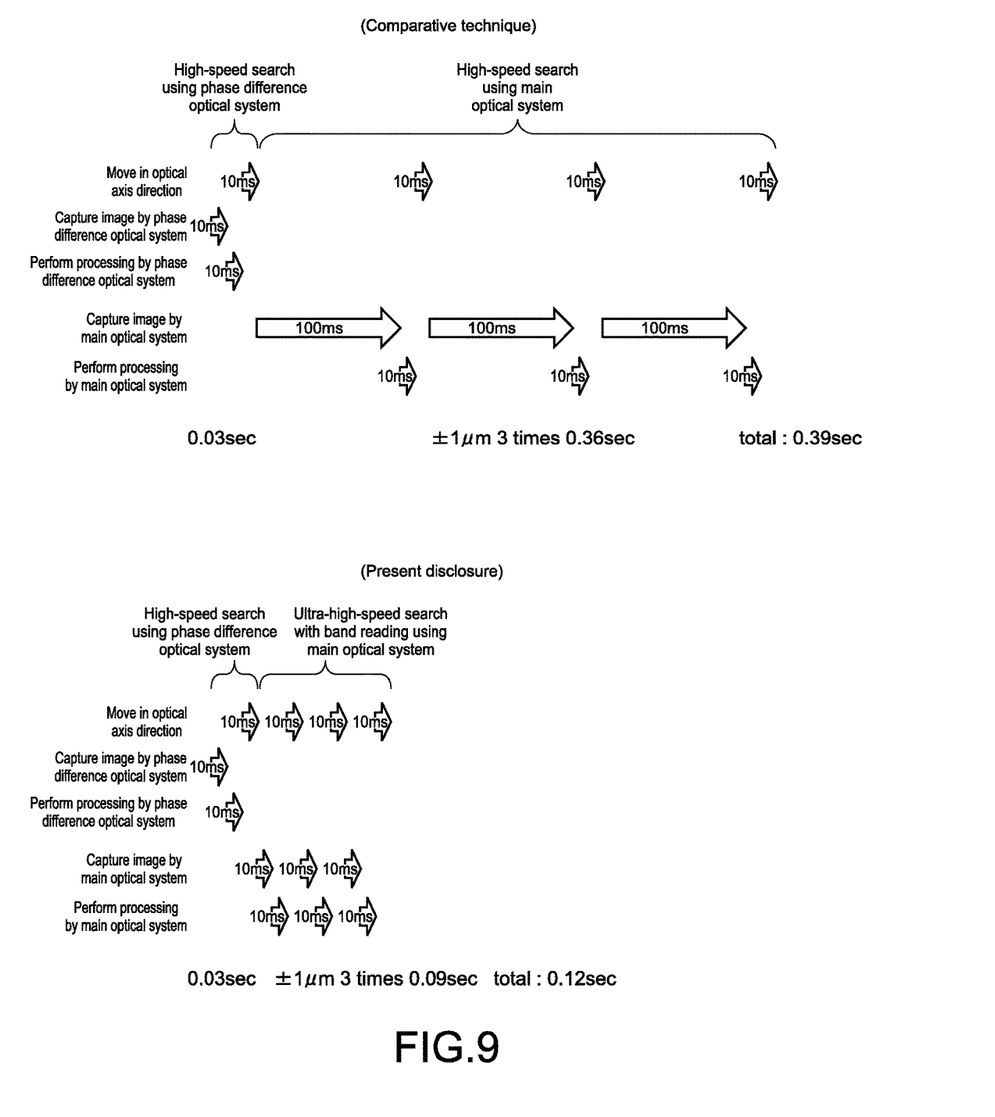
FIG. 9 is a diagram showing effects in speed obtained by the digital microscope apparatus according to this embodiment in comparison with another system.

FIG. 9 is a diagram showing effects in speed obtained by the digital microscope apparatus 100 according to this embodiment in comparison with another system.

For example, the assumption is made that the reading speed of an image from the imaging device 14 of the enlarged-image capturing unit 10 is 10 fps (100 ms/shot), the reading speed of an image from the imaging device 23 of the phase difference image capturing unit 20 is 100 fps (10 ms/shot), the time period that is necessary for image processing of detecting a focal point is 10 ms, and the number of times of reading of an image from the imaging device 14 of the enlarged-image capturing unit 10 is 3. Here, if an image within the total angle of view is read from the imaging device 14 of the enlarged-image capturing unit 10, the total time period that is necessary for focusing processing is 390 ms. On the other hand, in the case where the observed surface is restricted to $\frac{1}{10}$ by the band reading from the imaging device 14 of the enlarged-image capturing unit 10, for example, the total time period that is necessary for focusing processing is reduced to 120 ms.

Modified Example

In the above-mentioned embodiment, the in-focus position is roughly searched for by the phase difference image AF. However, the present disclosure is not limited thereto. Another system for roughly searching for an in-focus position may be adopted as long as an optical system having a depth of field larger than the enlarging optical system (optical system of the enlarged-image capturing unit 10) is capable of roughly searching for an in-focus position in a wide range.

In the above-mentioned embodiment, the position of the image of the sample is determined and the accuracy of the provisional in-focus position is verified based on the phase difference image captured by the phase difference image capturing unit 20. However, the present disclosure is not limited thereto. For example, a dedicated imaging unit configured to capture an image for determining the position of the sample and verifying the accuracy of the provisional in-focus position may be provided and an optical system configured to form an image on an imaging device of the dedicated imaging unit may be branched from the optical system of the enlarged-image capturing unit 10.

It should be noted that the present disclosure may also take the following configurations.

(1) A digital microscope apparatus, including:

a first imaging unit including a first optical system and a first imaging device, the first optical system including an objective lens configured to enlarge first and second images of a preparation that holds a sample, the first image being formed on the first imaging device through the first optical system;

a second imaging unit including a second optical system that is branched from the first optical system and has a depth of field larger than the first optical system and a second imaging device on which the second image is formed through the second optical system; and a controller configured to calculate a provisional in-focus position of the objective lens based on the second image captured by the second imaging unit, to determine an area of the first imaging device of the first imaging unit, the first image being read from the area, and to search for, based on the first image read from the area of the first imaging device, an in-focus position of the objective lens in a predetermined range determined using the provisional in-focus position as a reference.

(2) The digital microscope apparatus according to (1) above, in which the controller is configured to determine a position of an image of the sample based on the second image captured by the second imaging unit and to determine, based on the determination results, the area of the first imaging device of the first imaging unit, the first image being read from the area.

(3) The digital microscope apparatus according to (1) or (2) above, in which the controller is configured to verify accuracy of the provisional in-focus position based on the second image captured by the second imaging unit and to determine, based on the verification results, a necessity of searching for an in-focus position based on the first image read from the area of the first imaging device.

(4) The digital microscope apparatus according to any one of (1) to (3) above, in which the controller is configured to read an image within a total angle of view of the first imaging device of the first imaging unit in a case where the controller fails to determine the position of the image of the sample and to search for the in-focus position based on the image within the total angle of view.

(5) The digital microscope apparatus according to any one of (1) to (4) above, in which the second imaging unit is configured to capture a phase difference image.

It should be understood by those skilled in the art that various modifications, combinations, sub-combinations and alterations may occur depending on design requirements and other factors insofar as they are within the scope of the appended claims or the equivalents thereof.

What is claimed is:

1. An imaging control apparatus, comprising:
a controller configured to:
calculate a provisional in-focus position based on an image by phase difference auto focus;
based on a result of a detection of the image and using the provisional in-focus position as a reference, search for an in-focus position in a predetermined range in an optical axis direction;
based on the result of the detection of the image, search for the in-focus position based on an observed surface determined using the provisional in-focus position as a reference; and
output the in-focus position.

2. The imaging control apparatus according to claim 1, wherein the controller is further configured to:
acquire signals of a set of phase difference images that are formed on an imaging surface of a first imaging device.

3. The imaging control apparatus according to claim 2, wherein the controller is further configured to:
calculate an amount of defocus and an orientation of the defocus based on a distance between the set of phase difference images.

4. The imaging control apparatus according to claim 3, wherein the provisional in-focus position is calculated based on the image, the amount of defocus, and the orientation of the defocus.

5. The imaging control apparatus according to claim 4, wherein the search is done within a reading area of the image, and the reading area is restricted to a detected area that contains a sample based on a detection of the sample in the set of phase difference images.

6. The imaging control apparatus according to claim 1, wherein the phase difference auto focus uses light split into two light beams.

7. The imaging control apparatus according to claim 6, further comprising a splitter lens, wherein the two light beams are from the splitter lens.

8. A method of searching for an in-focus position of an imaging control apparatus, comprising:
calculating a provisional in-focus position based on an image by phase difference auto focus;
based on a result of a detection of the image and using the provisional in-focus position as a reference, searching for the in-focus position in a predetermined range in an optical axis direction;
based on the result of the detection of the image, searching for the in-focus position on an observed surface determined using the provisional in-focus position as a reference; and
outputting the in-focus position.

9. The method according to claim 8, further comprising:
acquiring signals of a set of phase difference images that are formed on an imaging surface of a first imaging device.

10. The method according to claim 9, further comprising:
calculating an amount of defocus and an orientation of the defocus based on a distance between the set of phase difference images.

11. The method according to claim 10, wherein the provisional in-focus position is calculated based on the image, the amount of defocus, and the orientation of the defocus.

12. The method according to claim 11, wherein the search is done within a reading area of the image, and the reading area is restricted to a detected area that contains a sample based on a detection of the sample in the set of phase difference images.

13. The method according to claim 8, wherein the phase difference auto focus uses light split into two light beams.

14. The method according to claim 13, further comprising a splitter lens, wherein the two light beams are from the splitter lens.

15. A system, comprising:
a microprocessor coupled to an imaging control device, the microprocessor programmed to:
calculate a provisional in-focus position based on an image by phase difference auto focus;
based on a result of a detection of the image and using the provisional in-focus position as a reference, search for an in-focus position in a predetermined range in an optical axis direction;
based on the result of the detection of the image, search for the in-focus position on an observed surface determined using the provisional in-focus position as a reference; and
output the in-focus position.

16. The system according to claim 15, wherein the microprocessor is further programmed to:
   acquire signals of a set of phase difference images that are formed on an imaging surface of a first imaging device.

17. The system according to claim 16, wherein the microprocessor is further programmed to:
   calculate an amount of defocus and an orientation of the defocus based on a distance between the set of phase difference images.

18. The system according to claim 17, wherein the provisional in-focus position is calculated based on the image, the amount of defocus, and the orientation of the defocus.

19. The system according to claim 18, wherein the search is done within a reading area of the image, and the reading area is restricted to a detected area that contains a sample based on a detection of the sample in the set of phase difference images.

20. The system according to claim 15, wherein the phase difference auto focus uses light split into two light beams.

21. The system according to claim 20, further comprising a splitter lens, wherein the two light beams are from the splitter lens.

* * * * *